United States Patent
Pal (10) Patent No.: US 9,608,981 B2
(45) Date of Patent: Mar. 28, 2017

(54) STRONG USER AUTHENTICATION FOR ACCESSING PROTECTED NETWORK

(71) Applicant: Red Hat, Inc., Raleigh, NC (US)

(72) Inventor: Dmitri Pal, Framingham, MA (US)

(73) Assignee: Red Hat, Inc., Raleigh, NC (US)

( * ) Notice: Subject to any disclaimer, the term of this patent is extended or adjusted under 35 U.S.C. 154(b) by 154 days.

(21) Appl. No.: 14/102,694

(22) Filed: Dec. 11, 2013

(65) Prior Publication Data

US 2015/0163222 A1    Jun. 11, 2015

(51) Int. Cl.
*H04L 29/06* (2006.01)

(52) U.S. Cl.
CPC ...... *H04L 63/0807* (2013.01); *H04L 63/0272* (2013.01); *H04L 2463/082* (2013.01)

(58) Field of Classification Search
CPC ............. H04L 63/0884; H04L 63/0807; H04L 63/0823; H04L 63/0838; H04L 63/0272; H04L 2463/082
USPC ......................................................... 713/168
See application file for complete search history.

(56) References Cited

U.S. PATENT DOCUMENTS

| | | | |
|---|---|---|---|
| 8,006,300 B2 | 8/2011 | Mizrah | |
| 8,433,288 B2 * | 4/2013 | Frew | H04W 12/06 455/410 |
| 8,473,749 B1 | 6/2013 | Madsen et al. | |
| 2006/0288230 A1 * | 12/2006 | Crall | H04L 9/083 713/183 |
| 2008/0115198 A1 * | 5/2008 | Hsu et al. | 726/5 |
| 2010/0211780 A1 * | 8/2010 | Mukkara et al. | 713/168 |
| 2011/0219439 A1 | 9/2011 | Strode et al. | |
| 2012/0214443 A1 | 8/2012 | Daigle | |
| 2013/0227291 A1 * | 8/2013 | Ahmed et al. | 713/171 |

OTHER PUBLICATIONS

"Recommended Practices for Deploying & Using Kerberos in Mixed Environments", MIT Kerberos Consortium, Copyright 2008, pp. 1-32.

Krause, Jordan, "Microsoft DirectAccess = Automatic VPNI", Microsoft Tech Net, 2 Pages, Published Feb. 19, 2013.

Dagorn, Nathalie, et al., "Practical Authentication in Distributed Environments", CESI, University of Luxembourg, 2005, pp. 1-6.

* cited by examiner

*Primary Examiner* — Hadi Armouche
*Assistant Examiner* — Angela Holmes
(74) *Attorney, Agent, or Firm* — Lowenstein Sandler LLP (57) ABSTRACT

Systems and methods for strong user authentication for accessing protected networks. An example method may include: transmitting, by a processing device, an authentication request to an authentication server; receiving an access granting token from the authentication server; transmitting, to a nonce server, a nonce request using the access granting token; receiving a cryptographic nonce from the nonce server; and transmitting, to a virtual private network (VPN) server, a VPN connection request using the cryptographic nonce.

15 Claims, 5 Drawing Sheets

STRONG USER AUTHENTICATION FOR ACCESSING PROTECTED NETWORK

TECHNICAL FIELD

The present disclosure is generally related to distributed computer systems, and is more specifically related to systems and methods for authenticating users accessing virtual private networks.

BACKGROUND

Multi-factor authentication is an authentication method that requires the entity seeking to be the authenticated (e.g., a computer system user) to present two or more of the three basic authentication factors: the knowledge factor ("something only the user knows"), the possession factor ("something only the user has"), and the inherence factor ("something only the user is"). The more factors are employed by the authentication process, the higher is the probability that the user indeed possesses the asserted identity. Two-factor authentication is commonly employed in computer authentication, where the user may be required to supply a set of credentials covering the knowledge factor and the possession factor (e.g., a user password and a one-time code), or the knowledge factor and the inherence factor (e.g., a user password and a biometric input).

While multi-factor authentication is commonly regarded as strong authentication, other strong authentication varieties are known. In other words, strong authentication does not have to be multi-factor authentication. In an illustrative example, soliciting answers to multiple challenge questions may be regarded as a strong authentication method, but not multi-factor authentication, since multiple knowledge factors are provided. In another illustrative example, an authentication method which does not involve transmitting the password provides strong authentication.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for authenticating users accessing computing resources residing within protected environments (e.g., applications and/or data residing on enterprise networks).

In an illustrative example, an enterprise network may be accessible over a virtual private network. "Virtual private network" (VPN) herein shall refer to means for establishing protected communication sessions between a remote client device or system and a core network (e.g., an enterprise network), and/or to such protected communication sessions. A client program (referred to as a VPN client) running on a user's computer system (e.g., a laptop computer, a desktop computer, or other computing device) may establish one or more encrypted communication sessions with a VPN server, and thus allow the user to securely access computing resources which reside on a protected network (such as an enterprise network).

A VPN server may require a strong user authentication (e.g., a two-factor authentication via a user password and a one-time code). Should the VPN connection be terminated for some reason (e.g., when a user closes the lid of his or her notebook computer thus causing the computer to transition into an inactive energy saving state), the user would have to go through the manual authentication process again (e.g., by inputting the two authentication factors) in order to re-establish the VPN connection (e.g., upon awakening the notebook computer when the lid has been opened).

The methods and systems disclosed herein facilitate eliminating the necessity of the user's performing the time consuming authentication process every time when he or she needs to re-establish a VPN connection that has once been established. In accordance with one or more aspects of the present disclosure, the user's computer may perform a strong user authentication once, for example, as a part of the initial user login sequence. Upon the user's strong authentication, an authentication token (e.g., a Kerberos ticket) may be acquired by the user's computer. The authentication token may then be reused for subsequent authentication to the VPN server and/or other corporate network services, until the user's computer shutdown or otherwise terminating the user's session (e.g., the user's logging out).

In an illustrative example, the user's computer system may prompt the user to supply the authentication credentials (e.g., a user identifier, a password, and a one-time code). The user's computer system may then transmit an authentication request based on the user's input to an authentication server (e.g., a Kerberos server). The user's computer system may then receive a ticket granting ticket (TGT) from the authentication server, and use the TGT to acquire a service ticket for a nonce server. The user's computer system may then transmit the service ticket to the nonce server, in order to receive a one-time or short-lived cryptographic nonce. The user's computer system may then feed the nonce to a VPN client to establish a VPN connection without requiring the user to provide another set of credentials.

Various aspects of the above referenced methods and systems are described in details herein below by way of examples, rather than by way of limitation.

Figure 1:
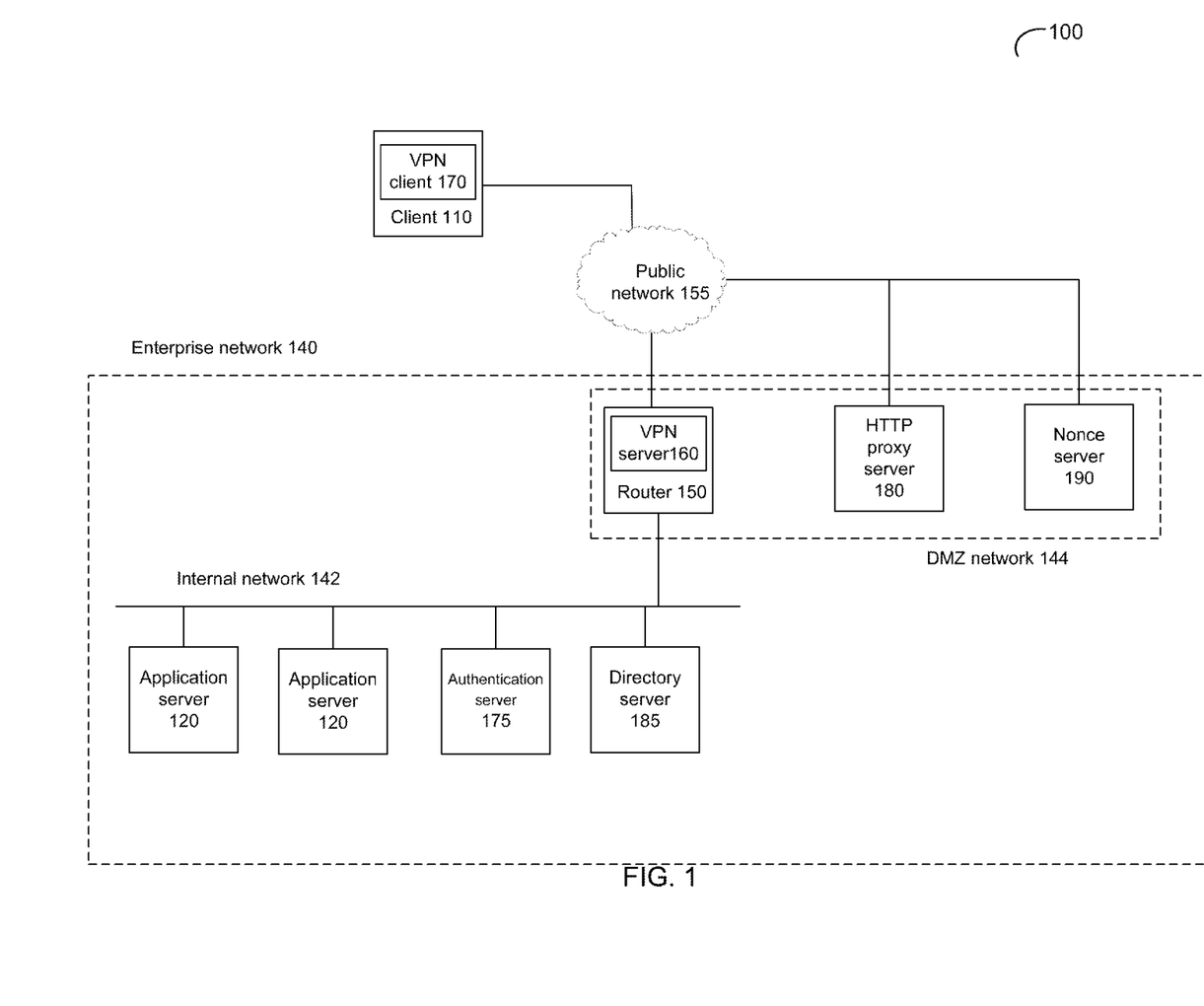
FIG. 1 depicts a high-level component diagram of an example distributed computer system 100 in accordance with one or more aspects of the present disclosure.

FIG. 1 depicts a high-level component diagram of an illustrative example of a distributed computer system 100 in accordance with one or more aspects of the present disclosure. "Computer system" herein shall refer to a system comprising one or more processors, one or more memory devices, and one or more communication interfaces. Distributed computer system 100 may comprise one or more computer systems interconnected by one or more networks.

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). "Memory device" herein shall refer to a volatile or non-volatile memory device, such as RAM, ROM, EEPROM, or any other device capable of storing data. "Communication interface" herein shall refer to circuitry or device communicatively coupled to one or more processors and capable of routing data between the processors and one or more external devices.

As schematically illustrated by FIG. 1, distributed system 100 may comprise a client computer 110 accessing, over one or more public networks 155, computing resources of one or more enterprise computer systems (e.g., service servers) 120 residing on an enterprise network 140. The latter may comprise physical servers and/or virtual machines, raw and file-based storage, routers, firewalls, and/or load balancers interconnected by two or more LANs. While in the illustrative example of FIG. 1 enterprise network 140 is shown as comprising an internal network 142 and a demilitarized zone (DMZ) network 144, in other implementations, enterprise network 140 may comprise various other network topologies, including two or more internal networks and/or two or more DMZ networks.

Router 150 interconnecting enterprise network 140 and a public network 155 (e.g., the Internet) may also act as a VPN server (e.g., by executing a VPN server daemon 160). VPN server 160 may be configured to establish, over a public network, VPN connections with a plurality of VPN clients. In an illustrative example, client computer 110 may execute a VPN client 170 configured to establish one or more encrypted communication sessions with VPN server 160, and thus allow the user to securely access computing resources which reside on enterprise network 140.

Enterprise network 140 may further comprise a directory server 185 designed to provide distributed directory information services by storing an organized set of records representing various entities, including users, user groups, organizations, etc. In certain implementations, directory server 185 may implement Lightweight Directory Access Protocol (LDAP).

Enterprise network 140 may further comprise an authentication server 175. While in the illustrative example of FIG. 1 authentication server 175 is shown as running on a dedicated hardware server, in other implementations authentication server 175 may be collocated with other functional components of enterprise network 140 (e.g., with directory server 185).

In certain implementations, authentication server 175 may implement Kerberos authentication protocol designed to allow computer systems communicating over a non-secure network to prove their identity to each other in a secure manner. Kerberos protocol messages are protected against eavesdropping and replay attacks.

In an illustrative example, a client 110 may request a user to provide login credentials including the user name, the user password, and a one-time code. Client 110 may then transmit the user's login credentials, via HTTP proxy server 180, to enterprise authentication server 175. As client 110 may establish a secure HTTPS connection to HTTP proxy server 180, the client-server message exchange described herein may be performed over a public network.

In certain implementations, authentication server 175 may perform the functionality of Kerberos Key Distribution Center (KDC). In an illustrative example, authentication server 175 may implement the One-Time Password Pre-Authentication Protocol, as described in RFC-6560 "One-Time Password (OTP) Pre-Authentication."

Authentication server 175 may issue an authentication token, also referred to as Ticket Granting Ticket (TGT) to client 110. The client may then use the TGT to get access to other enterprise services, such as nonce server 190, as described in more details herein above.

Nonce server 190 may be configured to generate a one-time or short-lived cryptographic nonce. "Nonce" herein shall refer to an arbitrary bit sequence represented, e.g., by a random or a pseudo-random number, a one-time password, or a short-lived certificate. In an illustrative example, nonce server may 190 implement Hash-based Message Authentication Code (HMAC)-based One-Time Password (HOTP) protocol. In another illustrative example, nonce server 190 may implement Time-based One-Time Password (TOTP) protocol. In another illustrative example, the nonce may be created in a form of a digital certificate (such as an X.509 digital certificate).

In certain implementations, nonce server 190 may generate a nonce in the form of a one-time password based on a secret shared by nonce server 190 and authentication server 175, so that the latter would be able to validate the nonce presented by a third party for authentication. Alternatively, nonce server 190 may generate a nonce in the form of a digital certificate which may be derived from the same trust chain as the certificate issued to VPN server 160, so that the latter would be able to validate the nonce presented by a third party for authentication.

While FIG. 1 shows nonce server 190 as a dedicated hardware server, in other implementations, nonce server 190 may be collocated with other components of enterprise network 140, e.g., authentication server 175. In the latter case, communications with nonce server 190 may be conducted via a proxy component.

Figure 2:
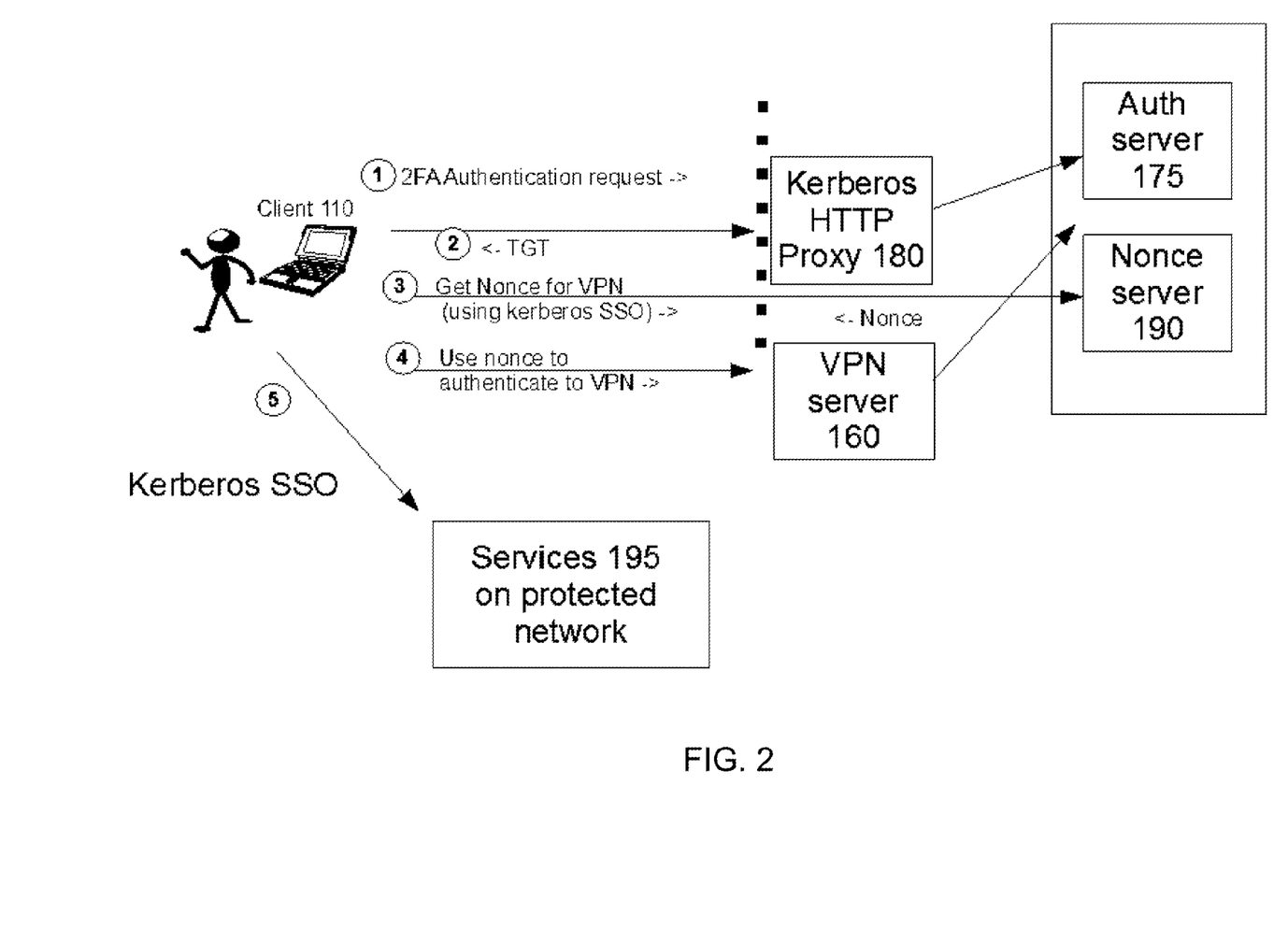
FIG. 2 schematically illustrates an example user authentication process, in accordance with one or more aspects of the present disclosure.

FIG. 2 schematically illustrates an example user authentication process in accordance with one or more aspects of the present disclosure. The user's computer system 110 may, as a part of the user's login procedure, prompt the user to supply the authentication credentials (e.g., a user identifier, a password, and a one-time code). Computer system 110 may then transmit an authentication request 1 based on the user's input to an authentication server 175 (e.g., a Kerberos server). The latter may respond with a ticket granting ticket (TGT) 2. Responsive to receiving the TGT, computer system 110 may use the TGT to acquire a service ticket to access nonce server 190. Computer system may then transmit a nonce request 3 to nonce server 190, in order to receive a one-time or short-lived cryptographic nonce. Responsive to receiving the nonce, computer system 110 may feed the nonce to a VPN client in order to establish a VPN connection with VPN server 160 (VPN authentication request 4).

Responsive to receiving the client connection request comprising a cryptographic nonce, VPN server 160 may validate the nonce. In certain implementations, the nonce is presented in the form of a one-time password, VPN server 160 may transmit an authentication request comprising the nonce to authentication server 175 (e.g., using RADIUS protocol). Alternatively, if the nonce is presented in the form of a digital certificate, VPN server 160 may validate the certificate by ascertaining that it was issued by a trusted certificate authority (CA), and is not referenced by a current certificate revocation list (CRL).

Upon successfully authenticating the client, VPN server 160 may establish a VPN connection with client computer system 110 thus allowing the latter to access various services residing on protected network 140. In certain implementations, client computer system 110 may re-use the earlier acquired authentication token (e.g., a Kerberos TGT) for accessing the services residing on protected network 140.

While in the illustrative examples described herein with references to FIGS. 1-2, the authentication procedure performed by the client computer system and the authentication server conforms to Kerberos protocol, in other implementations, the authentication procedure may conform to another strong authentication protocol supporting the mechanism of acquiring authentication assertions and deriving or acquiring secondary credentials to access specific services via single sign-on.

Figure 3:
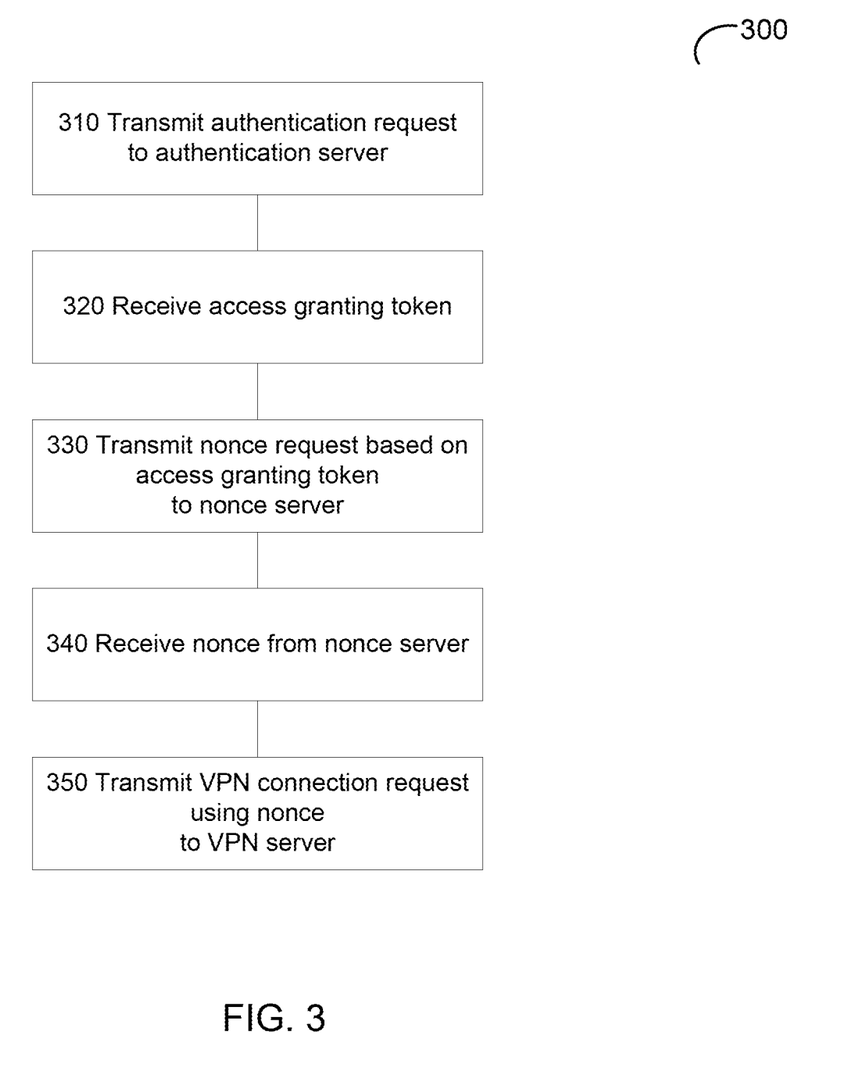
FIGS. 3-4 depicts flow diagrams of example methods for strong user authentication for accessing protected networks, in accordance with one or more aspects of the present disclosure.

FIG. 3 depicts a flow diagram of an example method 300 for strong user authentication for accessing a protected network. Method 300 and/or each of its individual functions, routines, subroutines, or operations may be performed by one or more processors of a client computer system (e.g., computer system 110 of FIG. 1) providing its user with the ability to access computing resources residing on a protected network (e.g., enterprise network 140 of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the client computer system may transmit an authentication request to an authentication server. The authentication request may comprise a user identifier, a user password, and a one-time code, and thus be a two-factor authentication request satisfying the knowledge factor and the possession factor. In certain implementations, the authentication request may be transmitted via an HTTP proxy server over a secure (SSL/TLS) connection.

In an illustrative example, the authentication procedure performed by the client computer system and the authentication server may conform to Kerberos protocol, as described in more details herein above. Alternatively, the authentication procedure may conform to another strong authentication protocol supporting the mechanism of acquiring authentication assertions and deriving or acquiring secondary credentials to access specific services via single sign-on.

Responsive to the authentication request, the client computer system may receive a ticket granting ticket (TGT) from the authentication server, and use the TGT to acquire service tickets to access other services via a single sign-on mechanism.

At block 320, the client computer system may receive an access granting token (e.g., a Kerberos service ticket) from the authentication server, as described in more details herein above.

At block 330, the client computer system may transmit a nonce request based on the access granting token to a nonce server. In certain implementations, the nonce request may comprise the access granting token (service ticket). Alternatively, the nonce request may comprise an entity derived from the access granting token (e.g., by presenting the access granting token to the authentication server or to a third party).

At block 340, the client computer system may receive a one-time or short-lived cryptographic nonce from the nonce server. The nonce may be provided by an arbitrary bit sequence represented, e.g., by a random or a pseudo-random number, a one-time password, or a short-lived certificate.

At block 350, the client computer system may use the nonce to produce a VPN connection request to be transmitted to a VPN server in order to establish a VPN connection to a protected network (e.g., an enterprise network). In certain implementations, if the nonce is in the form of a one-time password, the VPN connection request may comprise the nonce. Alternatively, if the nonce is in the form of a digital certificate, the latter may be used in an SSL handshake with the VPN server. Responsive to completing operations references by block 350, method 300 may terminate.

Figure 4:
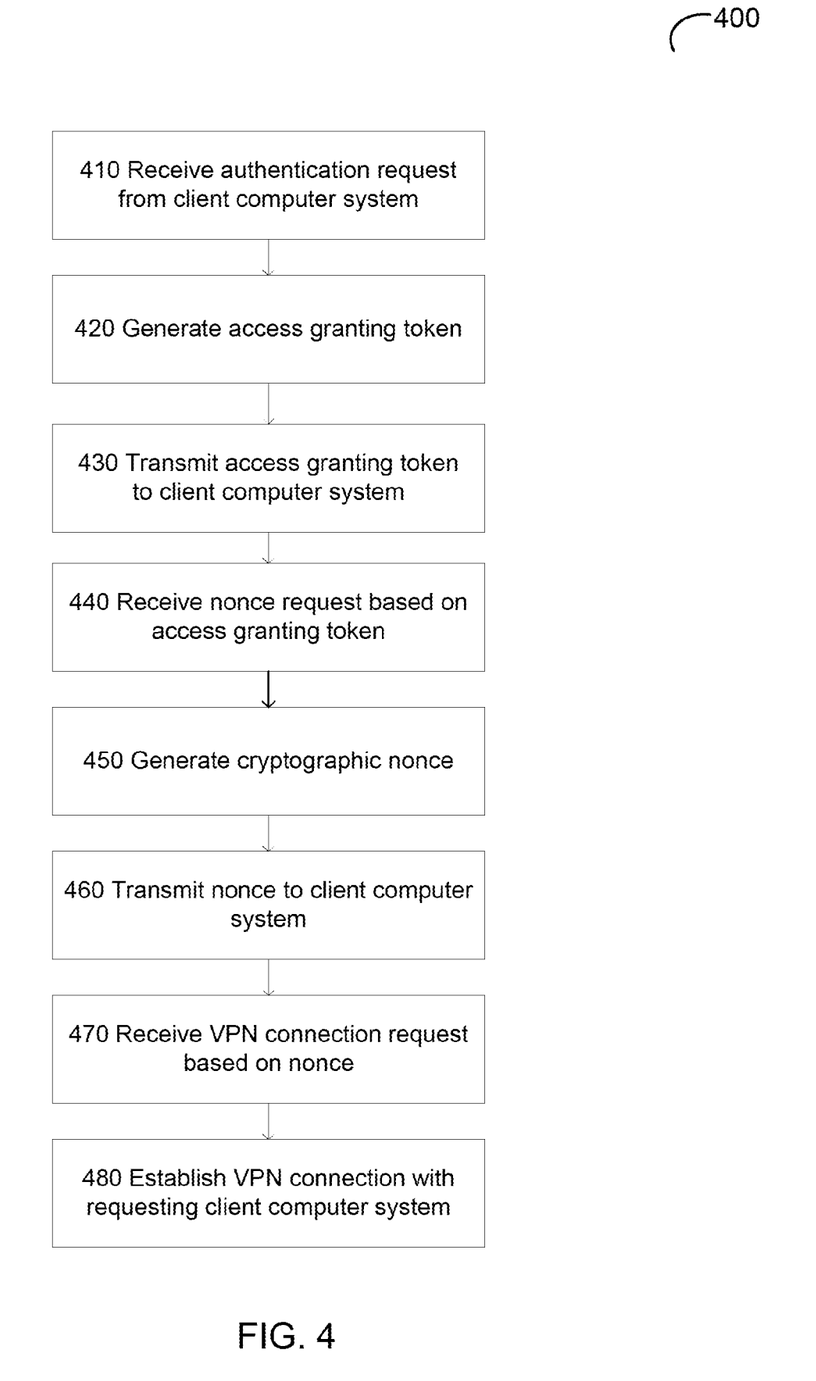

FIG. 4 depicts a flow diagram of an example method 400 for strong user authentication for accessing a protected network. Method 400 and/or each of its individual functions, routines, subroutines, or operations may be performed by one or more processors of a server computer system (e.g., one or more computer systems of enterprise network 140 of FIG. 1). In an illustrative example, method 400 may be performed by a server computer system comprising an authentication server, a nonce server, and a VPN server, as schematically illustrated by FIG. 1.

In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the authentication server may receive, from a client computer system, an authentication request comprising a user identifier. The authentication request may comprise a user identifier, a user password, and a one-time code, and thus be a two-factor authentication request satisfying the knowledge factor and the possession factor. In certain implementations, the authentication request may be transmitted via an HTTP proxy server over a secure (SSL/TLS) connection.

In an illustrative example, the authentication procedure performed by the client computer system and the authentication server may conform to Kerberos protocol, as described in more details herein above. Alternatively, the authentication procedure may conform to another strong authentication protocol supporting the mechanism of acquiring authentication assertions and deriving or acquiring secondary credentials to access specific services via single sign-on.

At block 420, the authentication server may generate an access granting token. In certain implementations, responsive to the authentication request, the authentication server may respond with a ticket granting ticket (TGT), which the client may then use to acquire service tickets to access other services via a single sign-on mechanism, as described in more details herein above. Hence, in an illustrative example, the access granting token may be provided by a service ticket.

At block 430, the authentication server may transmit the access granting token to the requesting client computer system.

At block 440, the nonce server may receive a nonce request based on the access granting token (e.g., Kerberos service ticket), as described in more details herein above. The nonce server may be configured to generate a one-time or short-lived cryptographic nonce. In an illustrative example, the nonce server may implement Hash-based Message Authentication Code (HMAC)-based One-Time Password (HOTP) protocol. In another illustrative example, the nonce server 190 may implement Time-based One-Time Password (TOTP) protocol. In another illustrative example, the nonce may be created in a form of a digital certificate (such as an X.509 digital certificate).

At block 450, the nonce server may generate a cryptographic nonce. The nonce may be provided by an arbitrary bit sequence represented, e.g., by a random or a pseudo-random number, a one-time password, or a short-lived certificate, as described in more details herein above.

At block 460, the nonce server may transmit the nonce to the requesting client computer system.

At block 470, responsive to receiving a client connection request based on a cryptographic nonce, the VPN server may validate the nonce. In certain implementations, the nonce is presented in the form of a one-time password, the VPN server may transmit an authentication request comprising the nonce to the authentication server (e.g., using RADIUS protocol). Alternatively, if the nonce is presented in the form of a digital certificate, VPN server 160 may validate the certificate by ascertaining that it was issued by a trusted certificate authority (CA), and is not referenced by a current certificate revocation list (CRL).

At block 480, responsive to successfully authenticating the client, the VPN server may establish a VPN connection with the requesting client computer system. Responsive to completing operations references by block 480, method 400 may terminate.

Figure 5:
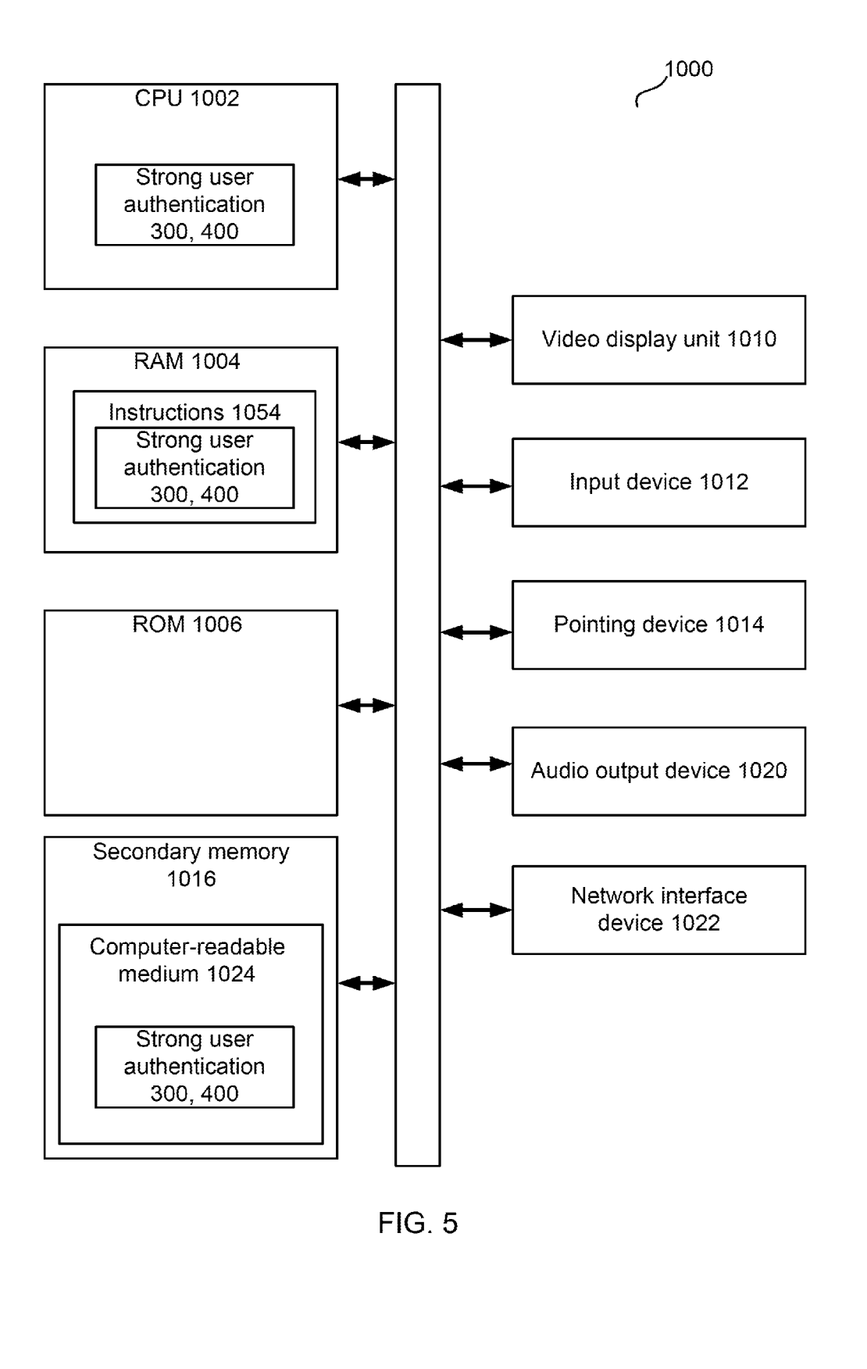
FIG. 5 depicts a block diagram of an illustrative computer system operating in accordance with examples of the present disclosure.

FIG. 5 depicts an example computer system 1000 within which a set of instructions, for causing the computer system to perform any one or more of the methods described herein, may be executed. In illustrative examples, the computer system 1000 may correspond to client computer system 110, enterprise computer system 120, router 150, authentication server 175 and/or directory server 185 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" may include any collection of computers that individually or jointly execute a set (or multiple sets) of instructions to perform any one or more of the methods described herein.

In a further aspect, computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alpha-numeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions of methods 300 and/or 400 for strong user authentication for accessing a protected network. Instructions of methods 300 and/or 400 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative example of FIG. 5 as a single medium, the term "computer-readable storage medium" may include a single medium or multiple media (e.g., a centralized or distributed database, and/or associated caches and servers) that store the one or more sets of executable instructions. The term "computer-readable storage medium" may also include any non-transitory medium that is capable of storing or encoding a set of instructions for execution by a computer that cause the computer to perform any one or more of the methods described herein. The term "computer-readable storage medium" may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform functions, routines, subroutines, or operations of the methods described herein. The required structure for a variety of these systems will appear as set forth in the description above.

The above description is intended to be illustrative, and not restrictive. Although the present disclosure has been described with references to specific illustrative examples and implementations, it will be recognized that the present disclosure is not limited to the examples described. The scope of the disclosure should be determined with reference to the following claims, along with the full scope of equivalents to which the claims are entitled.

What is claimed is:

1. A method, comprising:
   transmitting, by a processor, an authentication request in view of a user authentication credential to an authentication server, wherein the authentication request comprises a first authentication factor and a second authentication factor;
   receiving an access granting token from the authentication server;
   providing the access granting token to gain a service ticket to access a nonce server;
   transmitting, by the processor, directly to the nonce server, a nonce request in view of the service ticket;
   receiving a cryptographic nonce from the nonce server, wherein the cryptographic nonce is generated using a secret shared by the nonce server and the authentication server such that the authentication server can validate the cryptographic nonce when presented by a virtual private network (VPN) server, and wherein the cryptographic nonce is provided by at least one of a short-lived certificate or a one-time password; and
   transmitting, to VPN server, a VPN connection request comprising the cryptographic nonce for authentication of the cryptographic nonce by the VPN server to establish a VPN connection with the VPN server.

2. The method of claim 1, further comprising:
   establishing the VPN connection with the VPN server; and
   accessing, in view of the access granting token, a computing resource via the VPN connection.

3. The method of claim 1, wherein transmitting the authentication request is performed via an HTTP proxy server.

4. The method of claim 1, wherein transmitting the authentication request is performed over an SSL connection.

5. The method of claim 1, wherein the authentication request conforms to a Kerberos protocol.

6. A method, comprising:
   responsive to receiving an authentication request in view of a user authentication credential from a client computer system, generating an access granting token by an authentication server, wherein the authentication request comprises a first authentication factor and a second authentication factor;
   transmitting, by a processor of a server computer system, the access granting token to the client computer system;
   responsive to receiving an access request in view of the access granting token, providing a service ticket for direct access to a nonce server to request a cryptographic nonce by the client computer system, wherein the cryptographic nonce is generated by the nonce server using a secret shared by the nonce server and the authentication server such that the authentication server can validate the cryptographic nonce when presented by a virtual private network (VPN) server, and wherein the cryptographic nonce is provided by at least one of a short-lived certificate or a one-time password;
   responsive to receiving a VPN connection request comprising the cryptographic nonce, authenticating the cryptographic nonce; and
   responsive to a successful authentication of the cryptographic nonce, establishing a VPN connection with the client computer system.

7. The method of claim 6, wherein generating an access granting token is performed according to Kerberos protocol.

8. A computer system comprising:
   a memory; and
   a processor, operatively coupled to the memory, to:
   transmit an authentication request in view of a user authentication credential to an authentication server, wherein the authentication request comprises a first authentication factor and a second authentication factor;
   receive an access granting token from the authentication server;
   providing the access granting token to gain a service ticket to access a nonce server;
   transmit, directly to the nonce server, a nonce request in view of the service ticket;
   receive a cryptographic nonce from the nonce server, wherein the cryptographic nonce is generated using a secret shared by the nonce server and the authentication server such that the authentication server can validate the cryptographic nonce when presented by a virtual private network (VPN) server, and wherein the cryptographic nonce is provided by at least one of a short-lived certificate or a one-time password; and
   transmit, to VPN server, a VPN connection request comprising the cryptographic nonce for authentication of the cryptographic nonce by the VPN server to establish a VPN connection with the VPN server.

9. The system of claim 8, wherein the processor is further to:
   establish the VPN connection with the VPN server; and
   access, in view of the access granting token, a computing resource via the VPN connection.

10. The system of claim 8, wherein to transmit the authentication request is to transmit the authentication request via an HTTP proxy server.

11. The system of claim 8, wherein the authentication request conforms to a Kerberos protocol.

12. A computer-readable non-transitory storage medium comprising executable instructions to cause a processor to:
   transmit, by the processor, an authentication request in view of a user authentication credential to an authentication server, wherein the authentication request comprises a first authentication factor and a second authentication factor;

receive an access granting token from the authentication server;

transmit, by the processor, to a nonce server, a nonce request in view of the access granting token;

receive a cryptographic nonce from the nonce server, wherein the cryptographic nonce is generated using a secret shared by the nonce server and the authentication server such that the authentication server can validate the cryptographic nonce when presented by a virtual private network (VPN) server, and wherein the cryptographic nonce is provided by at least one of a short-lived certificate or a one-time password; and transmit, to VPN server, a VPN connection request comprising the cryptographic nonce for authentication of the cryptographic nonce by the VPN server to establish a VPN connection with the VPN server.

13. The computer-readable non-transitory storage medium of claim 12, further comprising executable instructions to cause the processor to:

establish the VPN connection with the VPN server; and access, in view of the access granting token, a computing resource via the VPN connection.

14. The computer-readable non-transitory storage medium of claim 12, wherein to transmit the authentication request, the processor is to transmit the authentication request via an HTTP proxy server.

15. The computer-readable non-transitory storage medium of claim 12, wherein the authentication request conforms to a Kerberos protocol.

* * * * *